(12) United States Patent
McCarty

(10) Patent No.: US 7,080,656 B2
(45) Date of Patent: Jul. 25, 2006

(54) VARIABLE VENT DIFFUSER

(75) Inventor: Michael Wildie McCarty, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 179 days.

(21) Appl. No.: 10/659,858

(22) Filed: Sep. 11, 2003

(65) Prior Publication Data

US 2005/0056316 A1    Mar. 17, 2005

(51) Int. Cl.
G05D 16/20  (2006.01)

(52) U.S. Cl. ............ 137/14; 137/487.5; 137/495

(58) Field of Classification Search ............. 137/14, 137/487.5, 494, 495, 504, 599.01, 601.13, 137/489.5; 251/120, 343, 347, 348
See application file for complete search history.

(56) References Cited

U.S. PATENT DOCUMENTS

| | | | |
|---|---|---|---|
| 1,726,721 | A | 9/1929 | Schullstrom |
| 3,026,800 | A | 3/1962 | Foster |
| 3,092,133 | A | 6/1963 | Clark |
| 3,977,423 | A | 8/1976 | Clayton |
| 4,011,886 | A * | 3/1977 | Wood ............ 137/492.5 |
| 4,325,406 | A | 4/1982 | Bron |
| 4,724,864 | A | 2/1988 | Schwelm |
| 5,450,873 | A | 9/1995 | Palmer |
| 6,102,071 | A | 8/2000 | Walton et al. |

FOREIGN PATENT DOCUMENTS

| | | |
|---|---|---|
| GB | 1352626 | 5/1974 |
| GB | 2165624 | 4/1986 |

OTHER PUBLICATIONS

Copy of International Search Report for International Patent Application No. PCT/US04/026646, dated Apr. 11, 2005, 6 pages.
Copy of Written Opinion for International Patent Application No. PCT/US04/026646, dated Apr. 11, 2005, 6 pages.

* cited by examiner

Primary Examiner—Ramesh Krishnamurthy
(74) Attorney, Agent, or Firm—Marshall, Gerstein & Borun LLP

(57) ABSTRACT

A diffuser apparatus for variably controlling fluid pressure release is provided. The diffuser apparatus includes an aperture for pressure release and an adjustable plug that can variably expose the aperture by adjusting positions in response to internal pressure levels. The diffuser apparatus may also include a safety mechanism that utilizes valves to add or release pressure acting on the plug in order to open and close the aperture.

17 Claims, 3 Drawing Sheets

VARIABLE VENT DIFFUSER

FIELD OF THE DISCLOSURE

The disclosure relates to diffusers and, more particularly, to vent diffusers that allow for fluid pressure release in a controlled manner.

BACKGROUND OF THE DISCLOSURE

Many circumstances arise in day-to-day manufacturing or processing applications that generate an excess in fluid pressure. If not relieved, such pressure can detrimentally affect operation, lead to machine malfunction, etc. Accordingly, various systems have been employed to vent excess pressure to atmosphere. Such systems can be as straightforward as an exhaust pipe or other fixed bleed orifice which constantly exhausts pressure to atmosphere. However, such devices are inherently inefficient due to constant release or loss of pressure.

In still further devices, such as general pressure relief valves, excess pressure is released to atmosphere only when internal pressure reaches a set point. At the set point, the relief valve "trips", thereby opening an orifice to atmosphere to relieve pressure. Such devices can thus be characterized as working in a bi-stable mode with a single set point. The device cannot therefore be adjusted or efficiently tailored to a dynamic environment once installed. U.S. Pat. No. 3,026,800 provides one example of such a device.

A need therefore exists to keep machines from ever reaching an extreme level of internal pressure. Diffusers are implemented in various machines to provide an outlet for such relief of excess internal pressure. Furthermore, such machines generally operate under a variety of extreme conditions, such as within petroleum and chemical processing facilities, power generator plants, boilers and the like. Given the extreme pressure and temperature ranges under which such machines operate the diffuser must be designed such that it does not adversely alter plant operations.

Conventional vent applications generally require a large control valve, actuator, and noise attenuating trim acting in concert with a fixed diffuser. In general, the control valve receives a signal indicative of fluid pressure and operates the actuator to relieve pressure when necessary. However, a problem with such a system is that conventional diffusers are unable to optimally perform outside a narrow range of operating conditions due to their fixed structure design. More specifically, the fixed state of the diffuser makes optimization difficult, in that the size of the diffuser cannot be altered when the level of internal pressure or fluid flow rate changes. Moreover, the large control valve and actuator burden those in the art with the necessity of adding such cumbersome and expensive components to the vent applications.

An existing option for the relief of undesired pressure is the use of a throttling vent valve. Conventional throttling vent valves utilize a pneumatic actuator directly connected to a throttling plug located inside the diffuser device. This requires the use of large actuators and can limit the application because of temperature concerns due to the close proximity of the actuators to the vent applications that generate and utilize pressure.

It can therefore be seen that there still remains a need for a diffuser that can operate optimally, even at the extreme conditions under which pressure generating or utilizing vent applications operate, while doing so in a reliable, compact, and inexpensive manner.

SUMMARY OF THE DISCLOSURE

In accordance with one aspect of the disclosure, a diffuser is provided which comprises a conduit having at least one aperture and an adjustable plug. The adjustable plug resides within the conduit and is adapted to move relative to the aperture.

In accordance with another aspect of the disclosure, a method for releasing fluid pressure from a conduit is provided which comprises providing a movable plug within the conduit, providing an aperture in the conduit, and moving the plug relative to the aperture.

In accordance with another aspect of the disclosure, a fluid pressure releasing vent diffuser is disclosed which comprises an output conduit adapted to be connected to a source of pressurized fluid, a retainer guide connected to the output conduit, the guide retainer having a closed end, a diffuser element positioned within the retainer guide, a plug slidably disposed within the retainer guide and adapted to move relative to the diffuser element, and a spring positioned between the plug and the closed end of the retainer guide, the spring biasing the plug toward a closed diffuser position, and fluid pressure biasing the plug toward an open diffuser position.

In accordance with another aspect of the disclosure, a variable vent diffuser is provided which comprises a guide adapted to be connected to an output discharging fluid pressure, the guide having at least one aperture, a movable element adapted to move within the guide and variably open and close the aperture, and means for automatically adjusting the movable element relative to the aperture based on at least one operating parameter.

These and other aspects and features of the disclosure will become more apparent from the following detailed description when taken in conjunction with the accompanying drawings.

Figure 1:
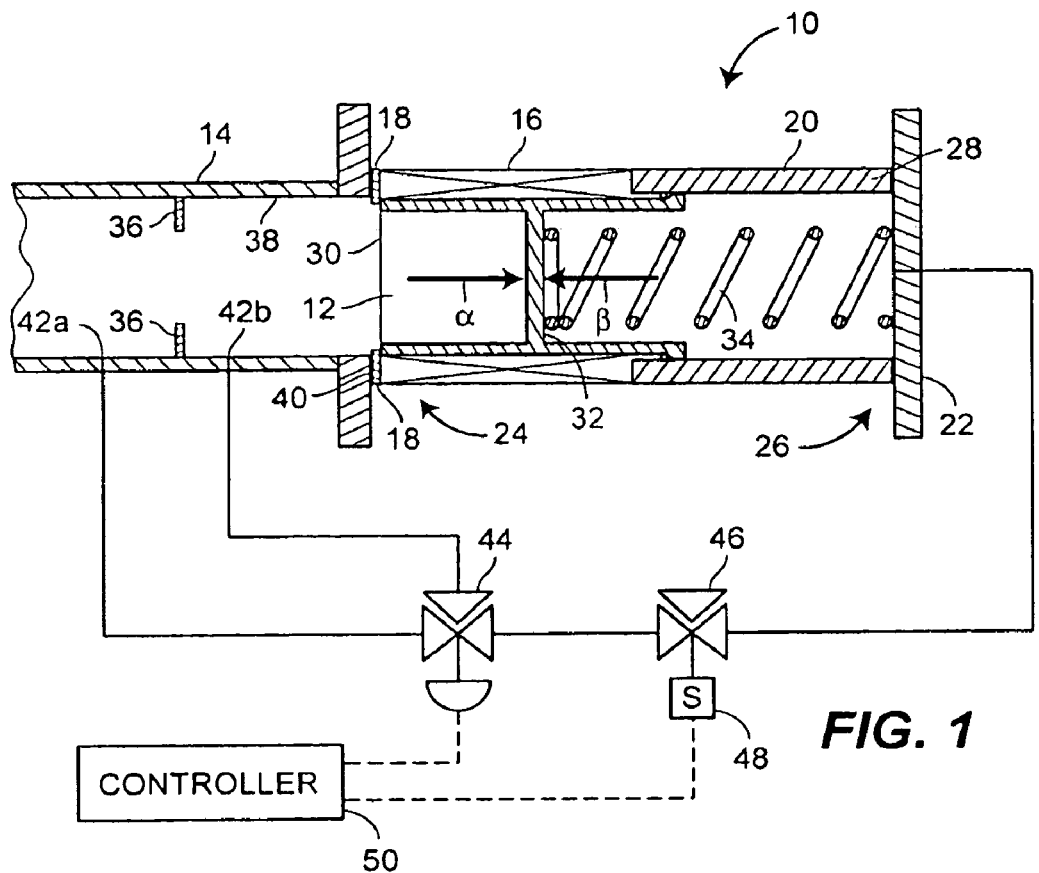
FIG. 1 is a diagrammatic cross-sectional view of a vent valve constructed in accordance with the disclosure and depicted in a closed position.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Figure 2:
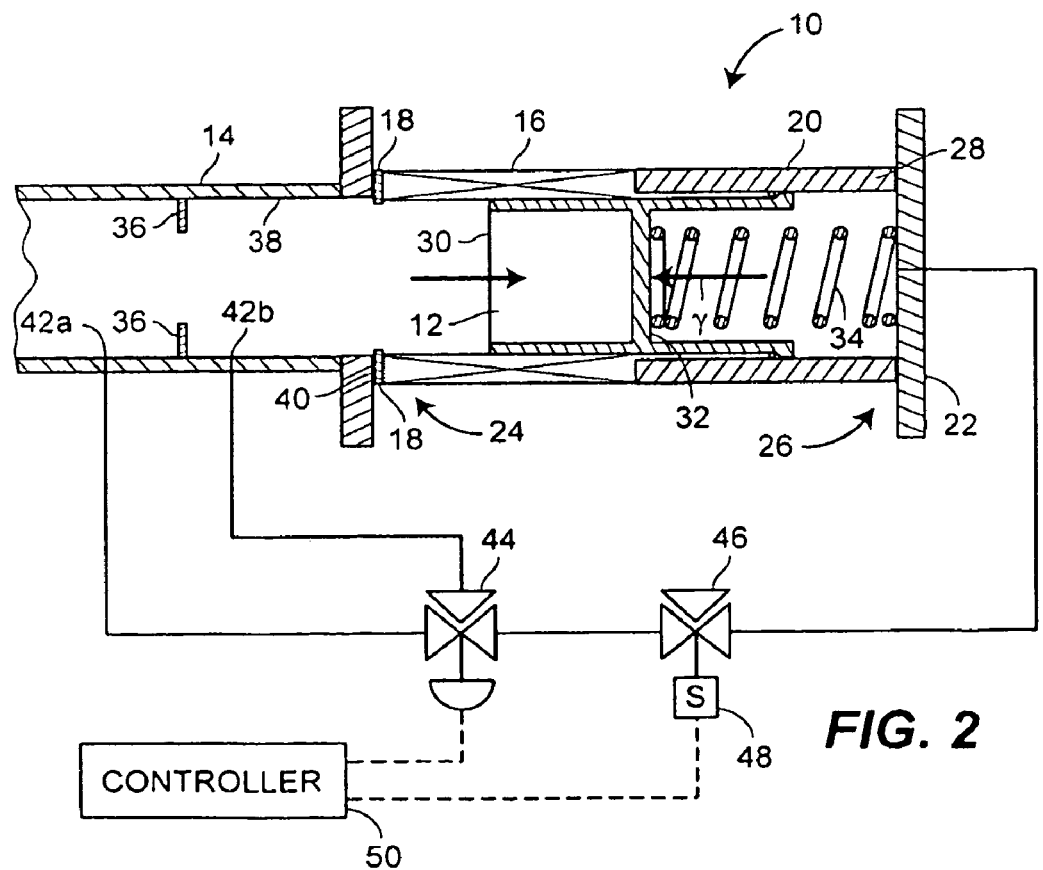
FIG. 2 is a diagrammatic cross-sectional view of a vent valve constructed in accordance with the disclosure and depicted in a semi-open position.
Figure 3:
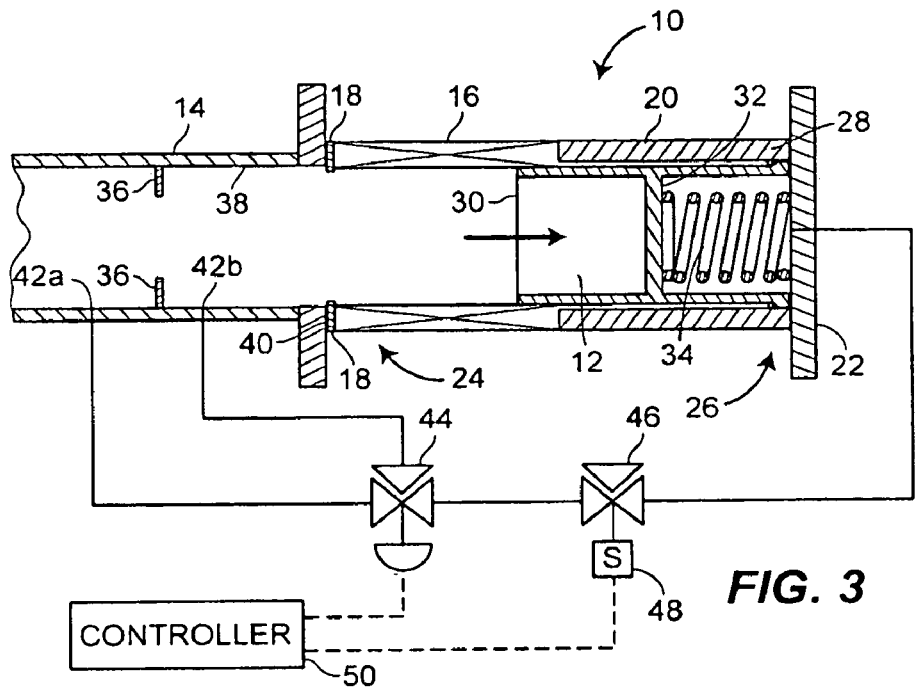
FIG. 3 is a diagrammatic cross-sectional view of a vent valve constructed in accordance with the disclosure and depicted in a fully open position.

Turning now to the drawings, FIGS. 1, 2 and 3 illustrate one embodiment of a variable vent diffuser 10 which includes an adjustable plug 12 within a conduit 14, and which can assume various positions adjacent a diffuser element or aperture 16 forming part of the conduit 14. In particular, FIG. 1 illustrates this embodiment in a fully closed position, where the adjustable plug 12 is in a position that maximizes the coverage of the diffuser element 16 by the adjustable plug. FIG. 3 illustrates the same embodiment in a fully open position, where the adjustable plug 12 is in a position which maximizes the exposure of the aperture 16 to the interior space of the conduit 14. FIG. 2 illustrates the embodiment with the adjustable plug 12 in a semi-open position between fully open and fully closed positions, thereby allowing some resistance to fluid flow between the exterior and the interior space of the conduit 14 through the diffuser element 16.

In addition, the variable vent diffuser 10 further includes a seat 18, a retainer 20, and an end plate 22. The diffuser element 16 may be physically adjacent to the seat 18 on a first end 24 of the conduit 14 and the retainer 20 may be on a second end 26 of the conduit 14. The end plate 22 may be adjacent to a portion 28 of the retainer 20 opposite the diffuser element 16. The diffuser element 16, seat 18, retainer 20, and end plate 22 cooperate to form a continuous barrier between the interior of the conduit 14 and the atmosphere except for the opening provided by the diffuser element 16. It is to be understood that the diffuser element 16 may be provided in the form of any of a host of known diffuser materials and designs having a perforated, porous or labyrinthine design facilitating controlled release of fluid.

The adjustable plug 12 resides within the conduit 14 and can adopt various positions between the seat 18 and end plate 22. Depending on the position of the adjustable plug 12, the diffuser element 16 is exposed, in varying degrees, to the interior of the conduit 14. The plug 12 may adjust position in response to forces including first and second opposing forces, represented by arrows α and β in the illustration, acting upon the plug 12. The first force α acts on a first end 30 of the plug 12 and is generated by fluid pressure within the conduit 14. The second force β acts on a second end 32 of the plug 12 and is generated by a biasing device, such as a spring 34. The difference between the first and second forces results in a net force that acts on the plug 12 and causes the plug 12 to slidably adjust within the conduit 14, thereby altering the degree of opening of the diffuser element 18.

In order to measure fluid flow pressure, the importance of which will be disclosed in further detail herein, any number of sensing devices may be provided. In the depicted embodiment, an orifice plate 36 is provided within the conduit 14, and may be connected directly to an interior surface 38 of the conduit 14 on a side 40 of the seat 18 opposite the diffuser element 16. On either side of the orifice plate 36 are pressure sensors or taps 42a, 42b mounted through the conduit 14. The pressure taps 42 are depicted as static pressure sensors, but may be dynamic pressure sensors if desired. Moreover, each tap 42 is in fluid communication with a control valve 44. The control valve 44 is also in fluid communication with a safety valve 46, which in turn is in fluid communication with the conduit 14 through the end plate 22. As will be understood by one of ordinary skill in the art, by providing first and second pressure sensors flanking a flow restriction, a delta pressure or change in pressure can be determined, as by the processing capability of a controller 50. Accordingly, upon detection of a decreased change in pressure within the conduit 14, the control valve 44 redirects fluid pressure through pressure taps 42 to the end plate 22, which generates a third force γ that acts on the second end 32 of the plug 12 to help move the plug 12 to a closed position. The third force γ acts on the plug 12 in the same direction as the spring 34 which helps to adjust the plug 12 towards a more closed position in order to reduce the exposure of the diffuser element 16 and help build up pressure within the conduit 14.

On the other hand, upon detection of an increased change in pressure within the conduit 14, the control valve 44 eliminates fluid communication with the end plate 22, thereby, preventing any increase in the third force γ and helping the plug 12 to adjust to a more open position as shown in FIG. 2. Furthermore, the third force γ, if any exists, that has been generated by the control valve 44 can be quickly removed through safety valve 46 by action of a solenoid 48, or the like, in electronic communication with the safety valve 46. Actuation of the solenoid 48 causes the safety valve 46 to release pressure into the atmosphere. This action also helps to adjust the plug 12 into a more open position in order to increase the exposure of the diffuser element 16 and helps relieve built up pressure within the conduit 14.

Figure 4:
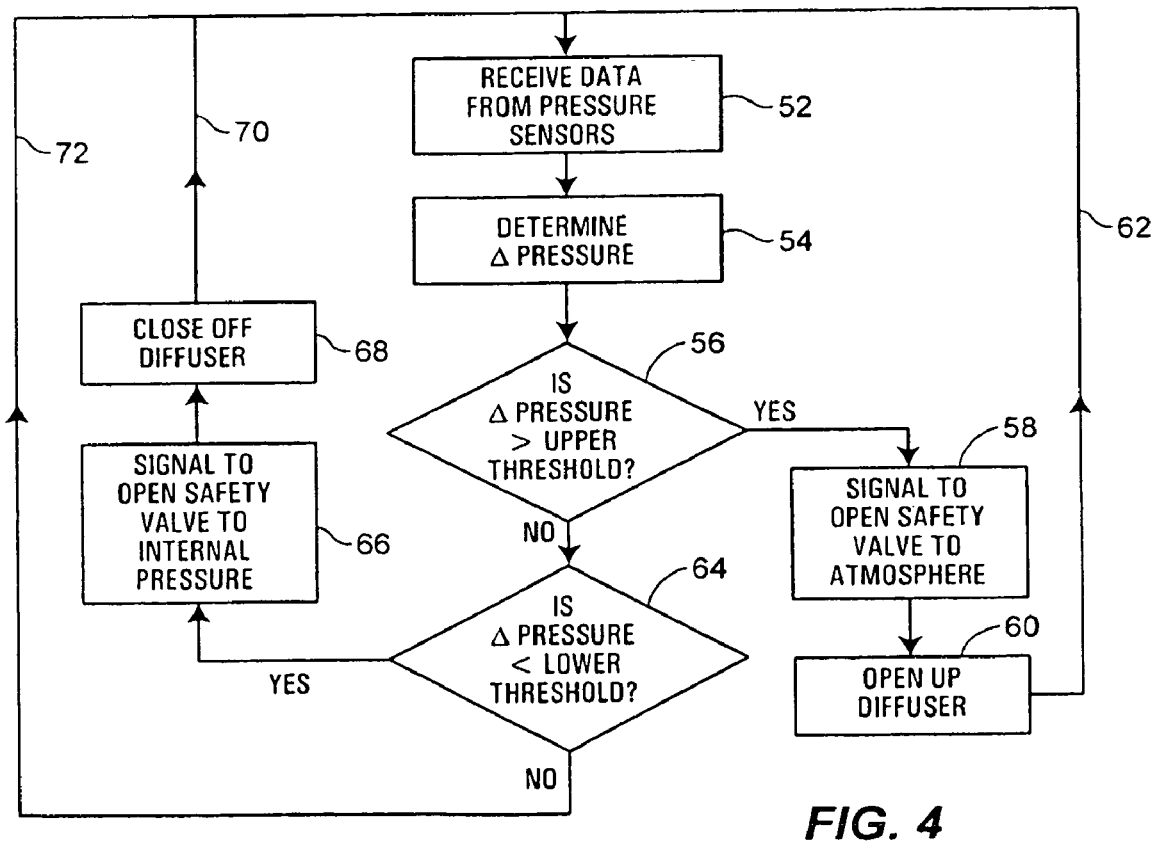
FIG. 4 is a flow chart depicting a sample sequence of steps which may be taken in accordance with the disclosure.

FIG. 4 illustrates a flow chart that represents an algorithm which may be undertaken by the controller 50. A first step 52 may be for the controller 50 to receive data signals from the pressure taps 42. A change in pressure can then be determined, as indicated in a step 54. Thereafter, a first decision 56 is made by asking if the change in pressure P is greater than a predetermined upper threshold stored in the memory of the controller 50. If the answer is yes, then a signal is delivered to open the safety valve 46 as indicated in a step 58, and which then leads to the opening of the diffuser element 16 as indicated by a step 60. Thereafter, the algorithm is undertaken again as shown by arrow 62.

If the answer is no, however, then a second decision 64 is made by asking if the P is less than a predetermined, lower threshold. If the answer is yes, then a signal is generated to create the third force γ as indicated in a step 66, which then leads to the closing of the diffuser element 16 as shown by a step 68. Thereafter, the algorithm is undertaken again as shown by a step 70. If the answer to question 62 is no, then the algorithm is undertaken again as well, as indicated by a step 72.

An "upper threshold" is defined herein as a threshold value that is predetermined by the user of the particular vent application in order to keep the internal fluid pressure output at acceptable levels. This value typically is viewed as slightly above the maximum internal fluid pressure at which one would operate the particular vent application. Once this upper threshold is surpassed, then the present invention acts to bring the pressure levels back to optimum working pressures by opening the diffuser element and releasing the excess pressure.

A "lower threshold" is defined herein as a threshold value that is predetermined by the user of the particular vent application in order to keep the internal fluid pressure at a level necessary for operation. This value typically is viewed as slightly below the minimum internal fluid pressure necessary for operation of the vent application. Once this lower threshold is surpassed, then the present invention acts to bring the pressure levels back to optimum working pressures by closing the diffuser element and opening the safety valve to atmosphere.

Figure 5:
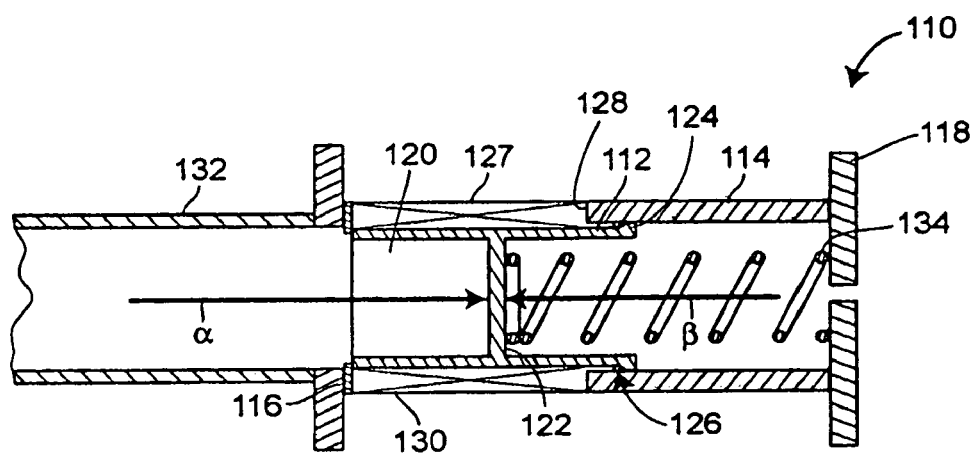
FIG. 5 is a cross-sectional view of an alternative embodiment of a vent valve diffuser constructed in accordance with the teachings of the disclosure.

An alternative embodiment of a vent valve diffuser constructed in accordance with the teachings of the disclosure is shown in FIG. 5 and is generally referred to by reference numeral 110. As is the case with the previously described embodiment, the diffuser 110 includes a plug 112 slidably disposed within a housing 113. The plug 112 is slidable between a fully closed position adjacent a seat 116 and a fully opened position wherein the plug 112 is adjacent an end plate 118. Both the retainer 114 and plug 112 may be substantially cylindrical in shape with the plug 112 including a cylindrical side wall 120 with a lateral strut 122 providing the plug 112 with a substantial "H" shape when depicted in cross-section. Moreover, the plug may include a radially outwardly extending lip 124 providing a shoulder against which an o-ring 126, or the like, may be provided to substantially seal the plug 112 against the retainer 114.

Also in a manner similar to the previously described embodiment, the vent valve diffuser 110 may include a diffuser element 127 within the retainer 114. In the depicted embodiment, the diffuser element 127 is provided in the form of an aperture 128 in which a porous element 130 is provided, but it is to be understood that in alternative embodiments, the aperture 128 may be simply left open or be provided in a form of a plurality of apertures, a single drilled hole, or the like.

In operation, it can therefore be seen that a vent valve diffuser 110 may be provided in fluid communication with a conduit 132 through which flows pressurized fluid for potential exhaust. If a force generated by the pressurized fluid flowing in the direction of arrow α is sufficient to overcome a force β generated by a spring 134 provided within the retainer 114, it can be seen that the plug 112 will slide in the direction of arrow α and thus compress the spring 134. Depending on the pressure differential between the respective pressures within the conduit 132 and the retainer 114, the plug 112 will slide and thus compress the spring 134 into any number of positions between the fully closed position depicted in FIG. 5, and the fully opened position, which is undepicted, but wherein the plug 112 abuts against the end plate 118 in a manner similar to that depicted in FIG. 3 with respect to the previously described embodiment.

In such an embodiment, it can therefore be seen that the operational range of the vent valve diffuser 110 is dependent upon the sizing of the spring 134. Additionally, one of ordinary skill in the art will readily recognize that the operational characteristics of the vent valve diffuser 110 can be dependent on the type of spring 134 used. For example, the spring 134 may be a straight coil spring as shown in FIG. 5, which provides a linear force-to-displacement relationship, or a conical spring (not shown), which can provide a non-linear force-to-displacement relationship. Once the spring is selected and installed, the operational range of the vent valve diffuser 110 is set, and it cannot be altered but for the provision of a different spring within the retainer 114.

Figure 6:
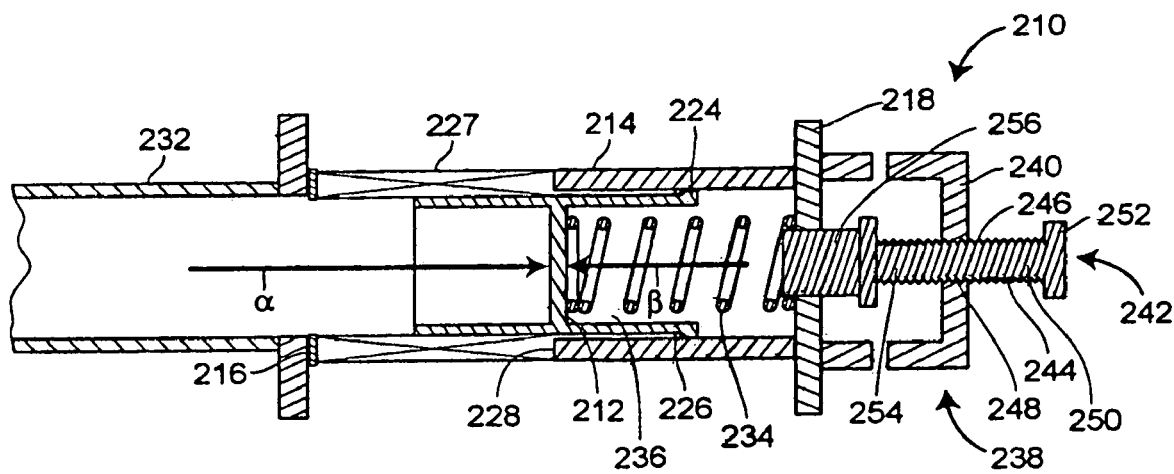
FIG. 6 is a cross-sectional view of another alternative embodiment of a vent valve diffuser constructed in accordance with the teaching of the disclosure.

In a still further embodiment, depicted in FIG. 6, the operational range of the diffuser is not solely dependent upon the sizing of the spring. More specifically, it will be noted that the vent valve diffuser of the alternative embodiment is generally referred to as reference numeral 210 and that all similarly used elements are described in terms of the same reference numerals, but being prefixed by a 200 series number as opposed to a 100 series number. For example, the vent valve diffuser 210 includes a plug 212 slidably disposed within a retainer 214 between a seat 216 and an end plate 218. In addition, a diffuser 227 is disposed within an aperture 228 of the retainer 214 with an o-ring 226 being positioned against a lip 224. A spring 234 biases the plug 212 toward the seat 216 and can be overcome if a pressure differential between a conduit 232 and a chamber 236 is sufficient to overcome the biasing force of the spring 234.

However, a difference in the second alternative embodiment is the provision of a manually adjustable spring pre-load assembly 238. As shown in FIG. 6, the assembly 238 may include a bracket 240 in which a plunger 242 is rotatably mounted. More specifically, the plunger 242 may include a stem 244 having a plurality of external threads 246 to interfit with a plurality of internal threads 248 provided within the bracket 240. A first end 250 of the plunger 242 may include a control knob 252, while a second end 254 of the plunger 250 may include a stopper 256. The coil spring 234 is adapted to engage the stopper 256, such that movement of the plunger 242 in the direction of arrow β causes the spring 234 to compress and thereby increase the pre-load on the spring 234. Accordingly, a different pressure differential between the pressures within the conduit 232 and the chamber 236 is required to overcome the biasing force of the spring 234 as the plunger 242 is moved in the direction of arrow β. Such movement can be accomplished by appropriate rotation of the plunger 242. In still further alternative embodiments, it is to be understood that the pre-load on the spring 234 can be accomplished by other mechanisms including, but not limited to, ratchet assemblies, cams, and the like. It is to be understood that spring 234 may be provided in the form of a conical spring as with the first embodiment.

From the foregoing, one of ordinary skill in the art will readily recognize that the teachings of the disclosure can be used to construct and operate a diffuser having a variable set point and operational range, thus enabling the diffuser to be tailored to the specific operation thereby minimizing the audible output of the diffuser.

What is claimed is:

1. A variable vent valve diffuser comprising:
   a conduit having at least one aperture;
   an adjustable plug residing within the conduit and adapted to move relative to the at least one aperture based on a sensed parameter of operation wherein the aperture is a diffuser element forming part of the conduit, the diffuser element being variably exposed to an interior of the conduit dependent upon the position of the plug, the plug being slidably adjusted in response to first and second opposing forces acting on the plug, the first force acting on a first end of the plug and being generated by fluid pressure within the conduit, the second force acting on a second end of the plug and being generated by a spring; and
   a control valve in fluid communication with the conduit, the control valve adapted to monitor fluid pressure within the conduit, and generate a third force adapted to act on the plug wherein the third force acts on the second end of the plug.

2. The variable vent valve diffuser of claim 1, wherein the control valve generates the third force based on a comparison between the monitored fluid pressure and a predetermined threshold.

3. A method for releasing fluid pressure from a conduit, comprising:
   providing a movable plug within the conduit, the plug being movable by first and second opposing forces acting on first and second opposing ends of the plug the first force being generated by a fluid pressure within the conduit, and the second force being generated by a spring;

providing an aperture in the conduit; and moving the plug relative to the aperture based on a sensed parameter of operation wherein the method further comprises identifying a pressure drop between at least two different points along the conduit and introducing a third force opposite the end exposed to fluid pressure within the conduit to adjust the position of the plug.

4. A fluid pressure releasing vent diffuser, comprising:
an output conduit adapted to be connected to a source of pressurized fluid to provide a primary fluid force, the output conduit being operatively connected to a pressure sensor adapted to transmit a signal representative of fluid pressure within the conduit;
a retainer guide connected to the output conduit, the retainer guide having a closed end;
a diffuser element positioned within the retainer guide;
a plug slidably disposed within the retainer guide and adapted to move relative to the diffuser element;
a spring positioned between the plug and the closed end of the retainer guide to provide a spring force, the spring force biasing the plug toward a closed diffuser position and a primary fluid force biasing the plug toward an open diffuser position; and
a supplemental source of pressurized fluid in communication with the closed end of the retainer guide and acting on the plug to provide a secondary force to supplement the spring force to move the plug wherein the supplemental source of pressurized fluid is the same source of pressurized fluid connected to the output conduit and communicates through a control valve connected to the supplemental source of pressurized fluid such that the control valve is further adapted to direct fluid pressure to the closed end of the retainer guide based on the fluid pressure signal.

5. The fluid pressure releasing vent diffuser of claim 4, wherein the pressure sensor includes an orifice plate in the output conduit and first and second pressure taps on opposite sides of the orifice plate.

6. The fluid pressure releasing vent diffuser of claim 5, wherein the first and second pressure taps are static pressure sensors.

7. The fluid pressure releasing vent diffuser of claim 5, wherein the control valve is a three-way control valve.

8. The fluid pressure releasing vent diffuser of claim 5, further including a relief valve between the control valve and the guide retainer, the relief valve adapted to relieve all fluid pressure from acting on a backside of the plug.

9. The fluid pressure releasing vent diffuser of claim 8, wherein the relief valve is solenoid actuated.

10. A variable vent diffuser, comprising:
a guide retainer adapted to be connected to an output discharging fluid pressure, the guide having at least one aperture wherein the at least one aperture is a diffuser element positioned within the guide retainer;
a movable element adapted to move within the guide and variably open and close the aperture, the movable element is a sliding plug positioned with the guide retainer and diffuser; and
means for automatically adjusting the movable element relative to the aperture based on at least one operating parameter wherein the means for automatically adjusting includes a spring biasing the plug against the discharging fluid pressure toward a closed position and further including a conduit connecting the discharging fluid to the plug and acting in concert with the spring.

11. The variable vent diffuser of claim 10, wherein the means for automatically adjusting further includes a control valve in the conduit connecting the discharging fluid to the plug.

12. The variable vent diffuser of claim 11, wherein the means for automatically adjusting further includes a sensor adapted to monitor an operating parameter of a machine with which the variable vent diffuser is operatively associated.

13. The variable vent diffuser of claim 12, wherein the operating parameter is fluid pressure within the output conduit, and wherein the means for automatically adjusting includes a pressure sensor adapted to transmit a signal representative of fluid pressure to the control valve.

14. The variable vent diffuser of claim 13, wherein the pressure sensor includes an orifice plate in the output conduit and first and second pressure taps on opposite sides of the orifice plate.

15. The variable vent diffuser of claim 14, wherein the pressure taps are static pressure sensors.

16. The variable vent diffuser of claim 14, wherein the control valve generates a control signal to the solenoid operating a safety valve based on a comparison of fluid pressure to a predetermined value.

17. The variable vent diffuser of claim 11, wherein the means for automatically adjusting further includes a relief valve adapted to adjust the plug to a fully open position.

* * * * *

UNITED STATES PATENT AND TRADEMARK OFFICE
CERTIFICATE OF CORRECTION

PATENT NO.       : 7,080,656 B2                                        Page 1 of 1
APPLICATION NO.  : 10/659858
DATED            : July 25, 2006
INVENTOR(S)      : Michael W. McCarty It is certified that error appears in the above-identified patent and that said Letters Patent is hereby corrected as shown below:

On the Title Page:

At Item (73), "LLC." should read -- LLC --.

In the Specification:

At Column 5, line 30, "arrow a" should be -- arrow α --.

At Column 5, line 33, "arrow a" should be -- arrow α --.

Signed and Sealed this

Fourth Day of November, 2008

JON W. DUDAS
*Director of the United States Patent and Trademark Office*